United States Patent
Kelly

(10) Patent No.: US 12,381,466 B2
(45) Date of Patent: Aug. 5, 2025

(54) COMPACT ANNULAR LINEAR INDUCTION PUMP

(71) Applicant: Energy, United States Department of, Washington, DC (US)

(72) Inventor: Bryce D Kelly, Idaho Falls, ID (US)

(73) Assignee: Energy, United States Department of, Washington, DC (US)

( * ) Notice: Subject to any disclaimer, the term of this patent is extended or adjusted under 35 U.S.C. 154(b) by 742 days.

(21) Appl. No.: 17/375,347

(22) Filed: Jul. 14, 2021

(65) Prior Publication Data

US 2023/0020187 A1 Jan. 19, 2023

(51) Int. Cl.
| | |
|---|---|
| H02K 44/06 | (2006.01) |
| H02K 44/08 | (2006.01) |
| H02K 44/10 | (2006.01) |
| H02K 44/12 | (2006.01) |
| H02K 44/16 | (2006.01) |
| H02K 44/28 | (2006.01) |

(52) U.S. Cl.
CPC .......... *H02K 44/06* (2013.01); *H02K 44/085* (2013.01); *H02K 44/10* (2013.01); *H02K 44/12* (2013.01); *H02K 44/16* (2013.01); *H02K 44/28* (2013.01)

(58) Field of Classification Search
CPC ...... H02K 44/06; H02K 44/02; H02K 44/085; H02K 44/10; H02K 44/12; H02K 44/16; H02K 44/28; Y02E 30/30
See application file for complete search history.

(56) References Cited

U.S. PATENT DOCUMENTS

| | | | | |
|---|---|---|---|---|
| 3,275,859 A | * | 9/1966 | Meyerand, Jr. ........ | H02K 44/26 310/11 |
| 3,483,405 A | * | 12/1969 | Prem .................... | H02K 44/085 310/11 |
| 4,828,459 A | * | 5/1989 | Behrens ............... | G21C 15/247 106/DIG. 3 |

(Continued)

OTHER PUBLICATIONS mwswire.com; Square Magnet Wire _ Aluminum and Copper Square Magnet Wire _ MWS Wire pdf from mwswire.com/magnet-wire/square-magnet-wire (Year: 2024).*

(Continued)

*Primary Examiner* — Charles G Freay
*Assistant Examiner* — David N Brandt
(74) *Attorney, Agent, or Firm* — Felisa L. Leisinger; Andrew C. Stark

(57) ABSTRACT

The compact annular linear pump has a duct, with an inlet and an outlet, positioned to surround an inner core. The duct has a fluid with paramagnetic properties disposed within it. Surrounding the duct is a stator having a first end and a second end. The stator has a plurality of slots that is divisible by three. There is a tooth at each end of the stator and between each slot. There is an electromagnetic circuit with three conductors wired in series disposed within the stator. Within each slot is a coil. Each of the three conductors travel through the stator by alternating through pairs of slots, each coil belonging to a single conductor and alternating conductors every third coil pair. The fluid travels from the inlet to the outlet by application of a current generator to the electromagnetic circuit creating a magnetic flux.

20 Claims, 3 Drawing Sheets

(56) References Cited

U.S. PATENT DOCUMENTS

| | | | | | |
|---|---|---|---|---|---|
| 4,836,769 | A | * | 6/1989 | Iwabuchi | H02K 3/325 428/377 |
| 5,240,382 | A | * | 8/1993 | Bessho | H02K 44/06 310/11 |
| 5,530,308 | A | * | 6/1996 | Fanning | H01F 41/084 310/179 |
| 2012/0085447 | A1 | * | 4/2012 | Hyde | H02K 44/02 137/807 |
| 2015/0069680 | A1 | * | 3/2015 | Kuri | C21D 1/63 266/241 |

OTHER PUBLICATIONS carpentertechnology.com; Hiperco 50—Specialty Alloys _ Carpenter Technology pdf from web.archive.org/web/20201128024300/ https://www.carpentertechnology.com/alloy-finder/hiperco-50 which shows the screenshot of carpentertechnology.com/alloy-finder/hiperco-50 from Nov. 28, 2020 (Year: 2020).* hpalloy.com; INCONEL 625 UNS N06625 pdf from web.archive.org/web/20201026080031/https://www.hpalloy.com/Alloys/descriptions/INCONEL625.aspx which shows the screenshot of hpalloy.com/Alloys/descriptions/INCONEL625.aspx from Oct. 26, 2020 (Year: 2020).*

Mwswire.com; Winding Wire _ Enameled Wire _ Round Magnet Wire _ MWS Wire pdf from web.archive.org/web/20190401230552/ https://mwswire.com/magnet-wire/round-copper-magnet-wire/ which shows the screenshot of mwswire.com/magnet-wire/round-copper-magnet-wire/ from Apr. 1, 2019 (Year: 2019).*

Momozaki, Yoichi. "A model of annular linear induction pumps." Oct. 27, 2016. United States. https://doi.org/10.2172/1331318.

Kwak, Jaesik; Kim, Hee Reyoung. "Optimization of outer core to reduce end effect of annular linear induction electromagnetic pump in prototype Generation-IV sodium-cooled fast reactor." Nuclear Engineering and Technology, vol. 52, No. 7, Jul. 2020, pp. 1380-1385. https://doi.org/10.1016/j.net.2019.12.006.

Sharma, Prashant; Sivakumar, L.S.; Prasad, R. Rajendra; Saxena, D.K.; Kumar, V.A. Suresh; Nashine, B.K.; Noushad, I.B.; Rajan, K.K.; Kalyanasundaram, P. "Design, Development and Testing of a Large Capacity Annular Linear Induction Pump." Energy Procedia, vol. 7, Aug. 22, 2011, pp. 622-629, https://doi.org/10.1016/j.egypro.2011.06.083.

* cited by examiner

COMPACT ANNULAR LINEAR INDUCTION PUMP

GOVERNMENT INTERESTS

The United States Government has rights in this invention pursuant to Contract No. DE-AC07-05ID14517 between the U.S. Department of Energy (DOE) and Battelle Energy Alliance.

FIELD OF THE INVENTION

The present invention relates generally to electromagnetic pumps, and more particularly, relates to a compact annular linear induction pump.

BACKGROUND OF THE INVENTION

In the 1950s, the United States developed the world's first sodium cooled nuclear reactors. Although the sodium cooled nuclear reactor design was not relied upon throughout the development of mainstream commercial nuclear power, it has boomeranged back onto the scene because of one its main advantages: its breed & burn design. Breed & burn reactors are garnering attention now because these reactors are able to make fuel as it is operating and consuming fuel. Additionally, these reactors can be fed spent fuel, using a resource that the world has an abundance of after its primary reliance on water moderated reactors. Further, these reactors can be fed natural uranium, creating a safer and less hazardous refueling operation. Sodium cooled reactors have other advantages including sodium being a weaker moderator allowing for higher reactor efficiency, having a high thermal heat capacity, and having an improved safety aspect of not needing to be pressurized.

In addition to re-ignited interest in sodium cooled reactors, there is new interest and development in the commercial nuclear power industry for microreactor technology. Microreactors are not defined by their fuel form or coolant. Instead, they have three main features, they are: (1) factory fabricated; (2) transportable; and (3) self-adjusting. All components of a microreactor would be fully assembled in a factory and shipped out to locations for installation. This eliminates difficulties associated with large-scale construction, reduces capital costs, and would help get the reactor up and running more quickly. Smaller unit designs will make microreactors very transportable. This would make it easy for vendors to ship the entire reactor by truck, shipping vessel, airplane or railcar. And, simple and responsive design concepts will allow microreactors to self-adjust. They won't require a large number of specialized operators and would utilize passive safety systems that prevent any potential for overheating or reactor meltdown. Because of these features, microreactors can operate in places large reactors can't. They provide choice to customers that need a constant and reliable source of clean power without the costs of a large construction project.

If the global community has any hope of reducing $CO_2$ emissions, new nuclear technologies must be in the mix to maintain the baseload power demands. Traditional nuclear power is plagued with problems. Existing nuclear power plants are ageing and even being shut down, and new nuclear power construction suffers from regulatory delays and unpredicted cost increases.

Therefore, there is a natural nexus between microreactors and sodium cooled reactors. Each offer solutions for more economical nuclear power, safer nuclear power, and cleaner nuclear power. However, with a science and industry as complex as commercial nuclear power based on large reactors, it's not a matter of simply shrinking components to make a sodium cooled microreactor. Further research and design are required to adjust reactor components to scale down the size while maintain power efficiencies and safety requirements. One such reactor component in a sodium cooled reactor is the electromagnetic pump that was developed for transporting the molten sodium coolant. Therefore, there remains a need for a compact annular linear induction electromagnetic pump.

SUMMARY OF THE INVENTION

Embodiments of the invention relate to a compact annular linear induction pump. The compact annular linear induction pump has a duct, with an inlet and an outlet, positioned to surround an inner core. The duct has a fluid with paramagnetic properties disposed within it. Surrounding the duct is a stator having a first end and a second end. The stator has a plurality of slots that is divisible by three corresponding to the number of electrical phases. There is a tooth at each end of the stator and between each slot. There is an electromagnetic circuit with three conductors wired in series disposed within the stator. Within each slot is a coil. Each of the three conductors travel through the stator by alternating through pairs of slots, each coil belonging to a single conductor and alternating conductors every third coil pair. The fluid travels from the inlet to the outlet by application of a current generator to the electromagnetic circuit creating a magnetic flux.

BRIEF DESCRIPTION OF THE DRAWINGS

Embodiments of the present invention are illustrated in the accompanying figures where.

DETAILED DESCRIPTION OF THE INVENTION

The following detailed description provides illustrations for embodiments of the present invention. Each example is provided by way of explanation of the present invention, not in limitation of the present invention. Those skilled in the art will recognize that other embodiments for carrying out or practicing the present invention are also possible. Therefore, it is intended that the present invention covers such modifications and variations as come within the scope of the appended claims and their equivalents.

Figure 1:
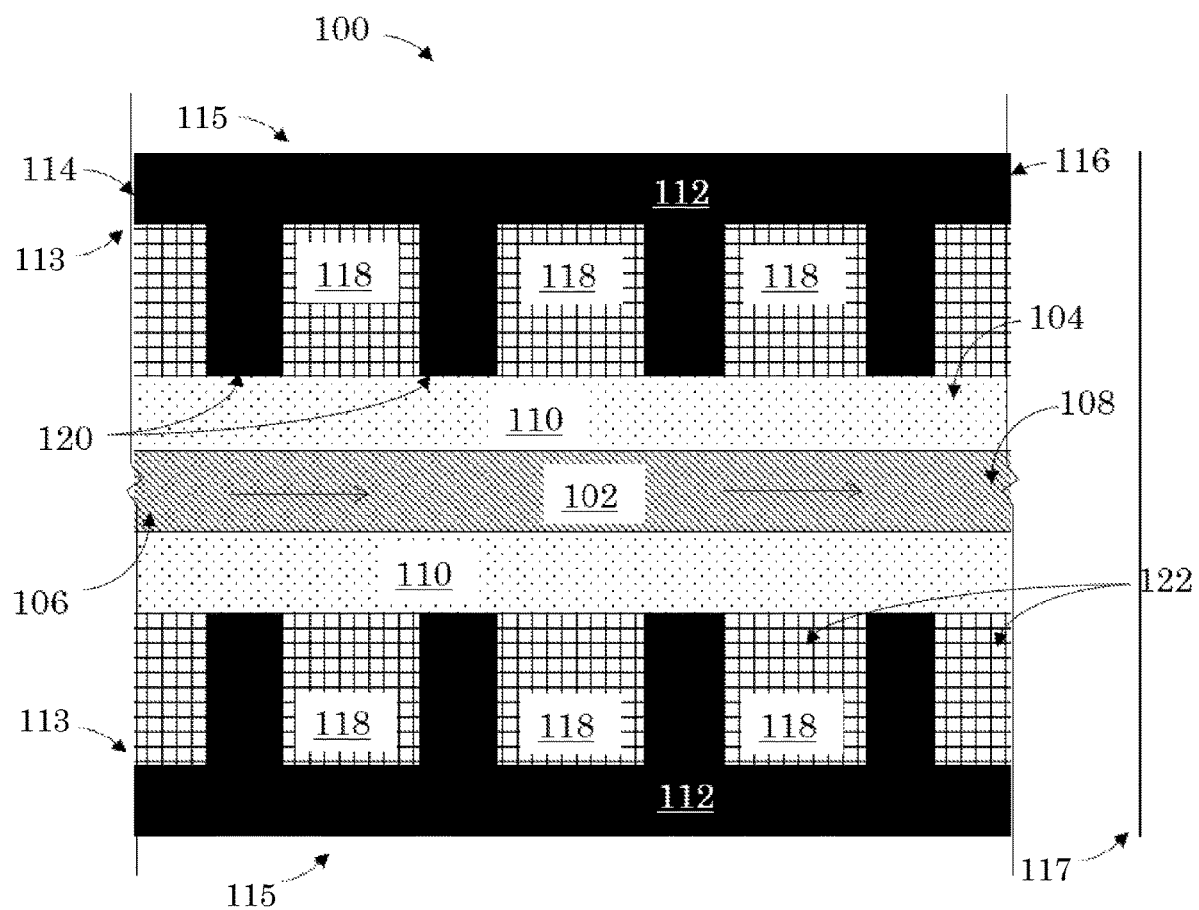
FIG. 1 illustrates a section view of a compact annular linear induction pump according to an embodiment of the invention.

Referring to FIG. 1, a section view of a compact linear annular pump 100 is shown. The compact linear annular pump 100 has a duct 104 positioned to surround an inner core 102. The duct 104 has an inlet 106 and an outlet 108. There is a fluid 110 disposed within the duct. The fluid 110 has paramagnetic properties. A stator 112 surrounds the duct 104. The stator 112 is cylindrical and has opposing internal and external cylindrical surfaces 113, 115. A cross-section through the linear annular pump 100 has a diameter 117, the diameter is defined by the external cylindrical surface 115. The stator 112 has a first end 114 and a second end 116. The stator 112 has a plurality of slots 118. The plurality of slots 118 is divisible by three. The stator 112 has a tooth 120 disposed between each of the plurality of slots 118, a tooth 120 disposed at the first end 114, and a tooth disposed at the second end 116.

The compact linear annular pump 100 works on the principal that a force acts on a conductor when a current carrying conductor is placed in a azimuthal magnetic field. The magnetic field is a linearly moving magnetic field that also induces a current in the fluid 110 because the fluid 110 has paramagnetic properties. The current in the fluid 110 and the moving magnetic field cause the fluid 110 to move in the linear direction the moving magnetic field travels from the first end 114 to the second end 116.

The inner core 102 is cylindrically shaped. The inner core 102 can be Hiperco Alloy 50 (Unified Numbering System (UNS) #R30005) with an Inconel 625 jacket (UNS #N06625). The duct 104, also cylindrical, coaxially surrounds the inner core 102. The duct 104 is not in communication with the inner core 102. Instead, there is an annular gap between the inner core 102 and the duct 104. The fluid 110 is located within the annular gap. The fluid 110 may completely fill the annular gap between the inner core 102 and the duct 104. The duct 104 has an inlet 106 and an outlet 108. The inlet 106 is where the fluid 110 enters the compact annular linear pump and the outlet 108 is where the fluid 110 exits the compact annular linear pump. The stator 112 coaxially surrounds and is in communication with the duct 104. Within the stator 112 are a plurality of slots 118 having a tooth 120 between each slot 118 and at the first end 106 and second end 108. Each slot 118 is a cylindrical channel within the stator 112. Each slot 118 houses a coil 122.

Figure 2:
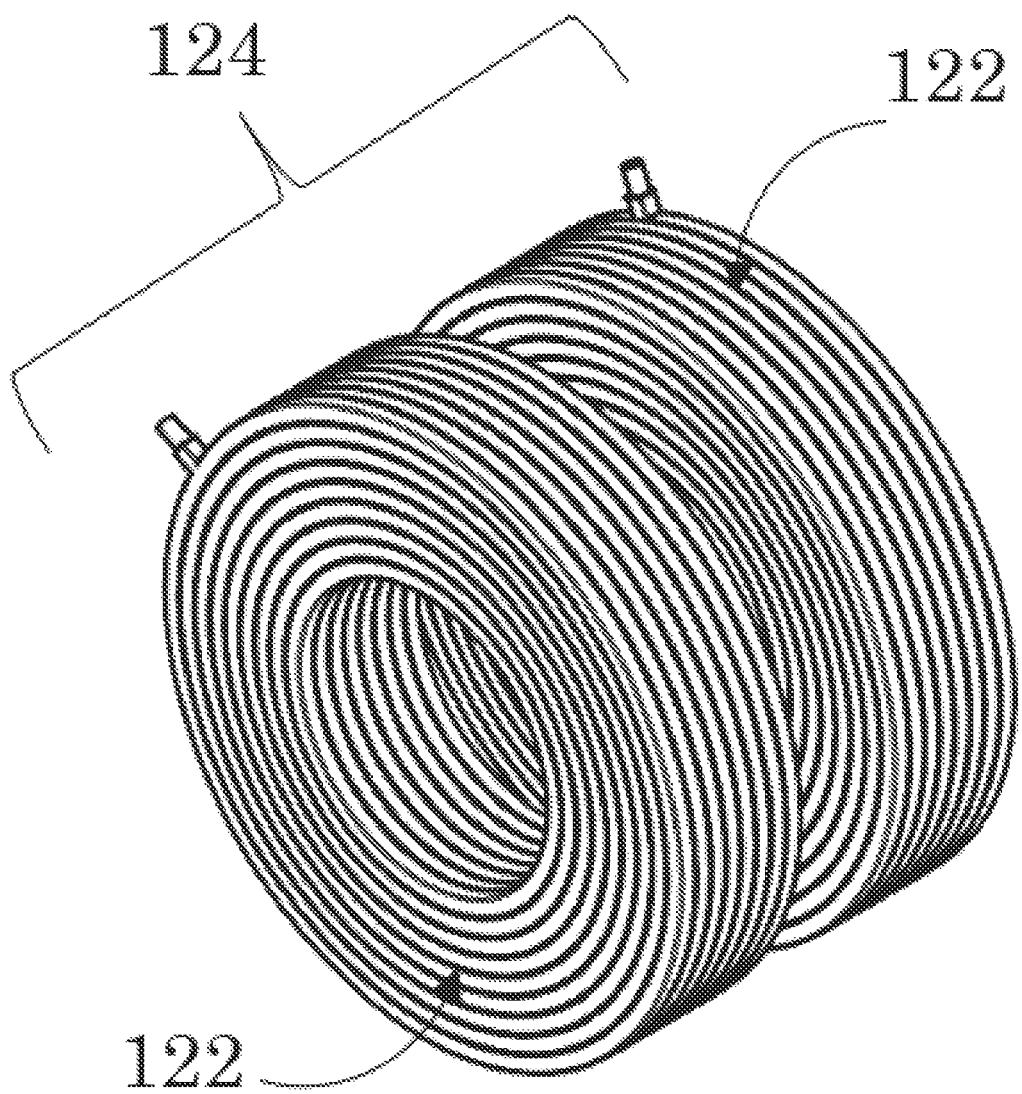
FIG. 2 illustrates a schematic view of a coil pair according to an embodiment of the invention.
Figure 3:
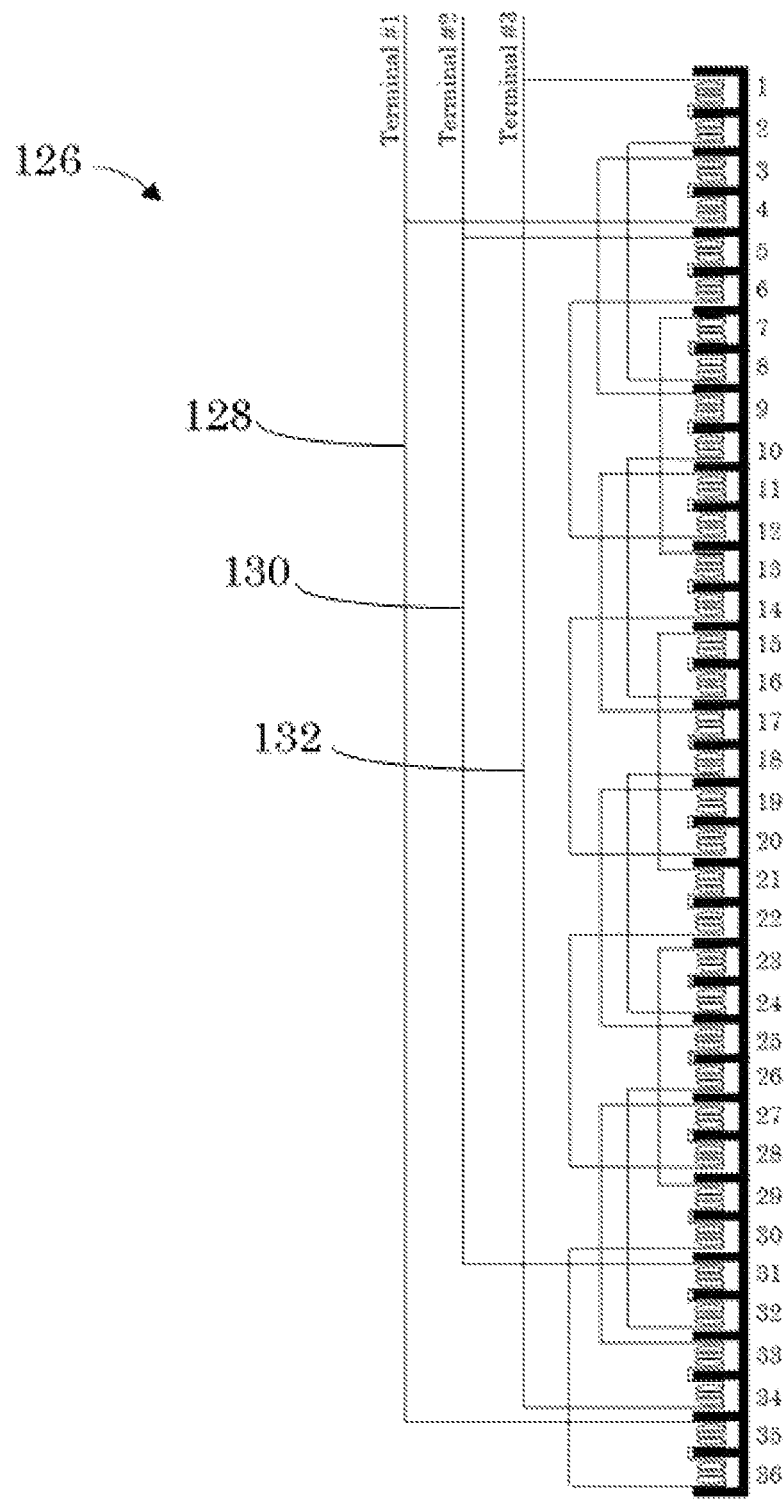
FIG. 3 is a wiring diagram according to an embodiment of the invention.

The compact linear annular pump 100 utilizes a unique coil 122 design to increase the density of the field produced and imparted on the fluid 108 to be pumped. The coil 122 is made of 13-gauge low oxygen copper wire with an insulator surrounding the wire. The insulator can be a glass fiber insulator, such as E-glass. Alternatively, the coil 122 can be any wire capable of passing the current through the compact linear annular pump 100. The coils 122 present in a coil pair 124, where each coil 122 of the pair 124 is wound in same directions of each other, as shown in FIG. 2. Each coil 122 may comprise dimensions of 8 by 9 wraps of the conductor. As shown in the FIG. 3 wiring diagram, the coil pairs 124 are wired in series with the rest of the coils 122. The electromagnetic circuit 126 has three conductors 128, 130, and 132. The three conductors 128, 130, and 132 are wired in series. The electromagnetic circuit 126 is adjacent to the internal cylindrical surface 113 of the stator 112 (FIG. 1). The electromagnetic circuit 126 has a plurality of coils 122, the plurality of coils 122 being equal to the plurality of slots 118. The slots 118 each have a coil 122 disposed within it. Each conductor 128, 130, and 132 travels through the electromagnetic circuit 126 by alternating through pairs of slots 118, as shown in FIG. 3. Each coil 122 within a slot 118 belongs to one of the three conductors 128, 130, and 132. Each coil 122 in a coil pair 124 belong to the same conductor. And each coil pair 124 alternates which conductor 128, 130, and 132 it belongs to every third coil pair 124. When the three conductors 128, 130, and 132 are activated by a current generator, a magnetic field is formed as a sinusoidal wave and moves in the linear direction the moving magnetic field travels from the first end 114 to the second end 116.

The compact annular linear induction pump 100 has a maximum operating temperature of 600° C. The compact annular linear induction pump 100 can have a flow rate is 94.6 L/min. The compact annular linear induction pump 100 can have a developed head pressure of 50 psi.

The compact annular linear induction pump 100 achieves a better flow rate and better head pressure than prior art pumps, while maintaining the required form factor. Prior art linear annular pumps did not utilize the same coil design nor materials of construction. The previous pumps were also inefficient, due to their shorter length. Due to their inefficiency and complexity compared to other mechanical and electromagnetic pumps, few vendors of ALIPs exist worldwide. In lieu of using inefficient and complex prior art ALIPs, companies would rather use cheaper mechanical pumps to move molten metal and then discard those pumps when they fail.

The present invention could be used for many applications, including for use in micro-reactors using electrically conductive fluids as coolant or nuclear batteries. Given its calculated efficiency and lack of moving parts, the present invention is well suited for autonomous reactor operation. With respect to micro-reactor applications, no micro-reactors utilizing electrically conductive coolant have been deployed to date. However, with the compact linear annular pump 100, micro-reactors utilizing electrically conductive coolant are possible, feasible, and efficient.

A compact linear annular pump 100 has a simple design, is easy to operate, has improved safety, and is low maintenance. These characteristics allow the compact linear annular pump 100 to be a superior choice for thermohydraulic systems in nuclear reactors, including micro-reactors. Because there are no moving parts, such as rotator blades of a mechanical pump, in contact with the fluid, a compact linear annular pump 100 is low-maintenance and improved safety due to the high operation temperatures and reactivity of the fluid. A compact linear annular pump 100 is easier to operate due to the simple design of the pump. Further, due to this design, there is a lower failure rate, less maintenance, and ease of operation.

In an embodiment, the compact linear annular pump 100 is 4 inches in diameter and 4 feet long, has 36 coils 122, can operate at 540 degree C. which is the melting temperature of aluminum, has a current density of 41.6 amps, an optimal frequency of 35 Hz, and a Lorentz force of $1.674*10^3$ Watts.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:
1. A compact annular linear induction pump comprising:
 a) a duct positioned to surround an inner core, the duct having an inlet and an outlet;
 b) a fluid disposed within the duct, the fluid having paramagnetic properties;
 c) a stator having a first end and a second end, the stator surrounding the duct, the stator having a plurality of slots, the plurality of slots being divisible by three, the stator having a tooth disposed between each of the plurality of slots, a tooth disposed at the first end, a tooth disposed at the second end;

d) an electromagnetic circuit disposed within the stator, the electromagnetic circuit having three conductors, the three conductors wired in series, the electromagnetic circuit having a plurality of coils formed from the conductors and wound around the inner core, the plurality of coils equals the plurality of slots, the slots having a coil of the plurality of coils disposed within each slot, each conductor traveling through the stator by alternating through pairs of the slots creating a coil pair in each of the pairs of slots, each coil belonging to a single conductor of the three conductors and alternating conductors of the three conductors every third coil pair; and e) wherein the fluid travels from the inlet to the outlet by application of a current generator to the electromagnetic circuit creating a magnetic flux.

2. The compact annular linear induction pump of claim 1, wherein each coil comprises dimensions of 8 by 9 wraps of a respective conductor of the three conductors.

3. The compact annular linear induction pump of claim 1, wherein each coil within each coil pair is wound in the same direction.

4. The compact annular linear induction pump of claim 1, further comprising insulation surrounding the conductors.

5. The compact linear induction pump of claim 4, wherein the insulation is e-glass.

6. The compact annular linear induction pump of claim 4, wherein the insulation is heat-strengthened glass or ceramic sleeving.

7. The compact annular linear induction pump of claim 1, wherein the stator is cylindrical and has opposing internal and external cylindrical surfaces, the electromagnetic circuit is adjacent to the internal cylindrical surface.

8. The compact annular linear induction pump of claim 7, wherein a cross-section through the annular linear induction pump has a diameter, the diameter is defined by the external cylindrical surface.

9. The compact annular linear induction pump of claim 8, wherein the diameter is 4 inches.

10. The compact annular linear induction pump of claim 1, wherein the compact annular linear induction pump has a length, the length is defined by the distance between the inlet and the outlet.

11. The compact annular linear induction pump of claim 10 wherein the length is 48 inches.

12. The compact annular linear induction pump of claim 1, wherein the inner core comprises an alloy having UNS #R30005 with a jacket comprising an alloy having UNS #N06625.

13. The compact annular linear induction pump of claim 1, wherein the compact annular linear induction pump has a maximum operating temperature of 600° C.

14. The compact annular linear induction pump of claim 1, wherein the compact annular linear induction pump has a flow rate and the flow rate is 94.6 L/min.

15. The compact annular linear induction pump of claim 1, wherein the compact annular linear induction pump has a developed head pressure and the developed head pressure is 50 psi.

16. The compact annular linear induction pump of claim 1, wherein each coil pair are pairs of adjacent coils disposed in adjoining slots of the plurality of slots.

17. The compact annular linear induction pump of claim 16, wherein each coil within each coil pair is wound in the same direction.

18. The compact annular linear induction pump of claim 17 having 36 coils.

19. The compact annular linear induction pump of claim 1 comprising a current density of 41.6 amps, a frequency of 35 Hz, and a Lorentz force of $1.674*10^3$ Watts.

20. The compact annular linear induction pump of claim 4 wherein each coil comprises copper gauge wire.

* * * * *